United States Patent [19]

Hart

[11] 4,329,725
[45] May 11, 1982

[54] CONTROL CIRCUITRY FOR MULTISTAGE FANS

[75] Inventor: Robert E. Hart, Clearwater, Fla.

[73] Assignee: Square D Company, Palatine, Ill.

[21] Appl. No.: 264,373

[22] Filed: May 15, 1981

Related U.S. Application Data

[62] Division of Ser. No. 83,034, Oct. 9, 1979.

[51] Int. Cl.³ .............................................. G05F 1/58
[52] U.S. Cl. ........................................ 361/18; 361/31; 361/58; 361/98; 330/207 P
[58] Field of Search .................... 361/31, 93, 98, 30, 361/18, 58; 330/207 P, 298

[56] References Cited

U.S. PATENT DOCUMENTS

| | | | |
|---|---|---|---|
| 3,753,079 | 8/1973 | Trilling | 361/18 |
| 3,796,943 | 3/1974 | Nelson | 361/18 |
| 3,967,207 | 6/1976 | Wheatley, Jr. | 361/98 |
| 3,979,643 | 9/1976 | Pelc | 361/98 |
| 4,202,023 | 5/1980 | Sears | 361/18 |
| 4,223,363 | 9/1980 | Santis et al. | 361/18 |

*Primary Examiner*—J. D. Miller
*Assistant Examiner*—L. C. Schroeder
*Attorney, Agent, or Firm*—Michael J. Femal

[57] ABSTRACT

A solid-state, multistage temperature controller for automatically controlling the operation of fans to maintain the temperature of an associated engine within preselected limits.

1 Claim, 4 Drawing Figures

FIG. 2.

CONTROL CIRCUITRY FOR MULTISTAGE FANS

This is a division of application Ser. No. 083,034, filed Oct. 9, 1979, and still pending.

BACKGROUND OF THE INVENTION

The problem of maintaining engine manifold cooling water at a temperature below boiling has established the need for a temperature sensitive circuitry to control cooling fans mounted on a locomotive.

Various types of automatic control circuits for controlling fans to provide temperature regulation are known in the prior art. One such system is disclosed in U.S. Pat. No. 3,332,621 (Automatic Control Means) which discloses a cam operated system for selectively closing the electrical contacts of associated motors to drive various fans in accordance with the desired temperature regulation.

SUMMARY OF THE INVENTION

The invention provides improved control circuitry for controlling and regulating the operation of multiple fans for providing cooling air flow in an associated engine.

More specifically, the present invention is directed to a solid-state multistage temperature controller. The circuitry of the present invention includes a thermistor sensor which is a variable resistor device which provides improved operational accuracy of the controller circuitry. The variable resistor device enables the temperature set points of the controller to be easily adjusted by varying the resistance of the resistor device by interchanging thermistors or by changing the thick film resistor pack. Circuitry is included which detects and displays an open or shorted thermistor probe.

The present invention also provides a selective time delay which prevents two fans from starting simultaneously. The delay may be by-passed in the event of fast temperature cycling. Current limiting or fold-back circuitry protects the control circuitry from damage for a time period limited to about thirty minutes upon the occurrence of a total or partial short.

The foregoing features and advantages of the present invention will be apparent from the following more particular description of the invention. The accompanying drawings listed hereinbelow are useful in explaining the invention wherein:

BRIEF DESCRIPTION OF THE DRAWINGS

FIG. 2 is a schematic diagram of the inventive circuitry;

FIG. 3 is a schematic diagram of an embodiment of an output stage including fold-back circuitry of the invention; and, FIG. 4 is a schematic diagram of a current limiting circuitry of the invention.

DESCRIPTION OF THE INVENTION

Figure 1:
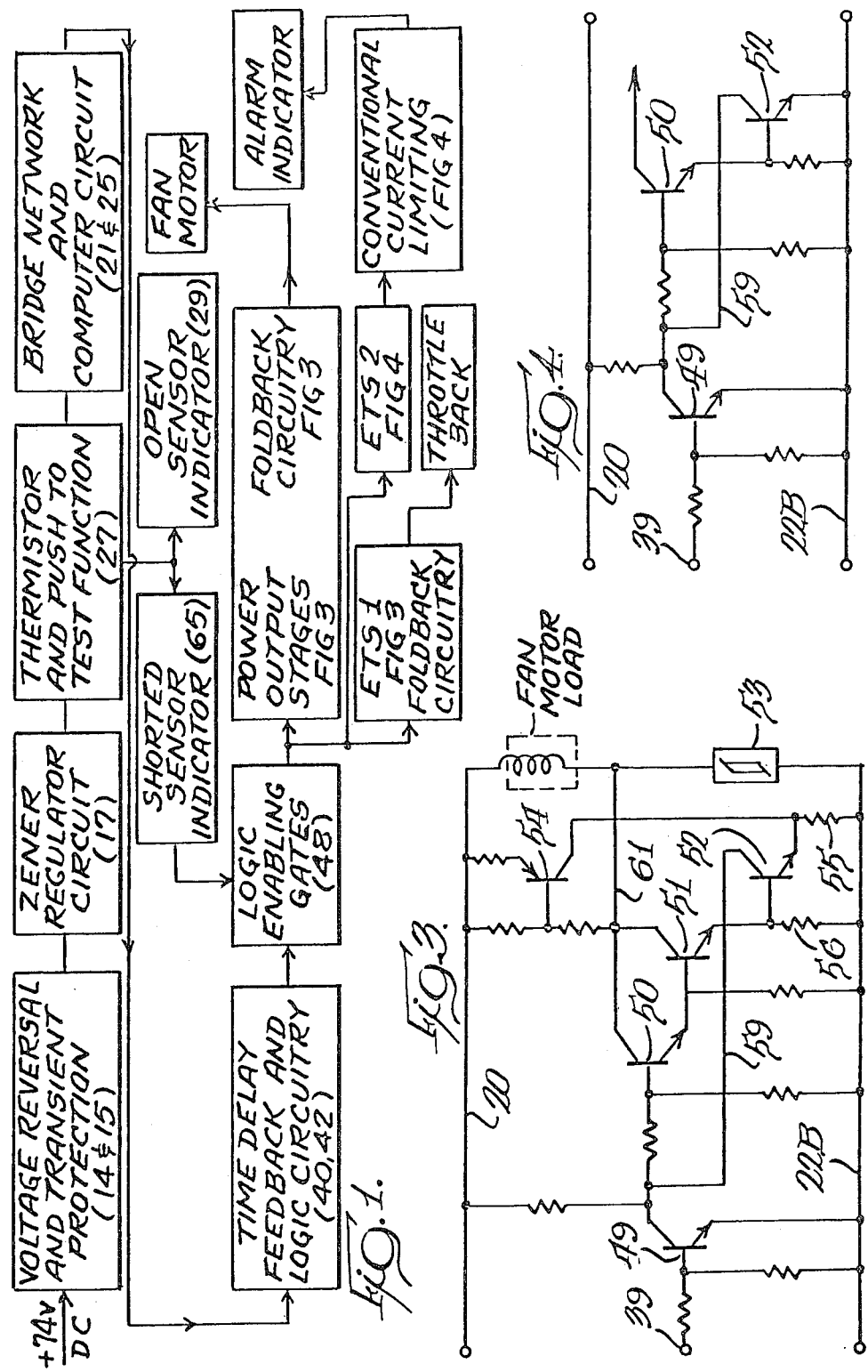
FIG. 1 is a block diagram of the inventive circuitry and includes a functional description of the various portions of the circuitry.

As alluded to above, the requirement that engine manifold cooling water be maintained at a temperature below boiling has established the need for a multistage temperature sensitive circuitry to sequentially control the various cooling fans mounted on a locomotive.

The present invention provides sensing and control circuitry including a thermistor sensing element or probe immersed in the coolant to provide a solid-state temperature control circuitry with an electrical signal proportional to the coolant temperature. When the coolant reaches a predetermined design temperature, the inventive circuitry will enable the first of the cooling fans; subsequent fans are enabled as coolant temperature increases. To minimize loading due to motor starting currents, time delay circuitry is used to sequence the operation of the cooling fans. In the event of a rapid temperature rise, the time delay of the circuitry will be adjusted to permit the fan motors to be enabled more rapidly. If all available fans are insufficient for providing adequate cooling, an emergency throttling system is activated to reduce engine speed and thus decrease the cooling temperature.

Figure 2:
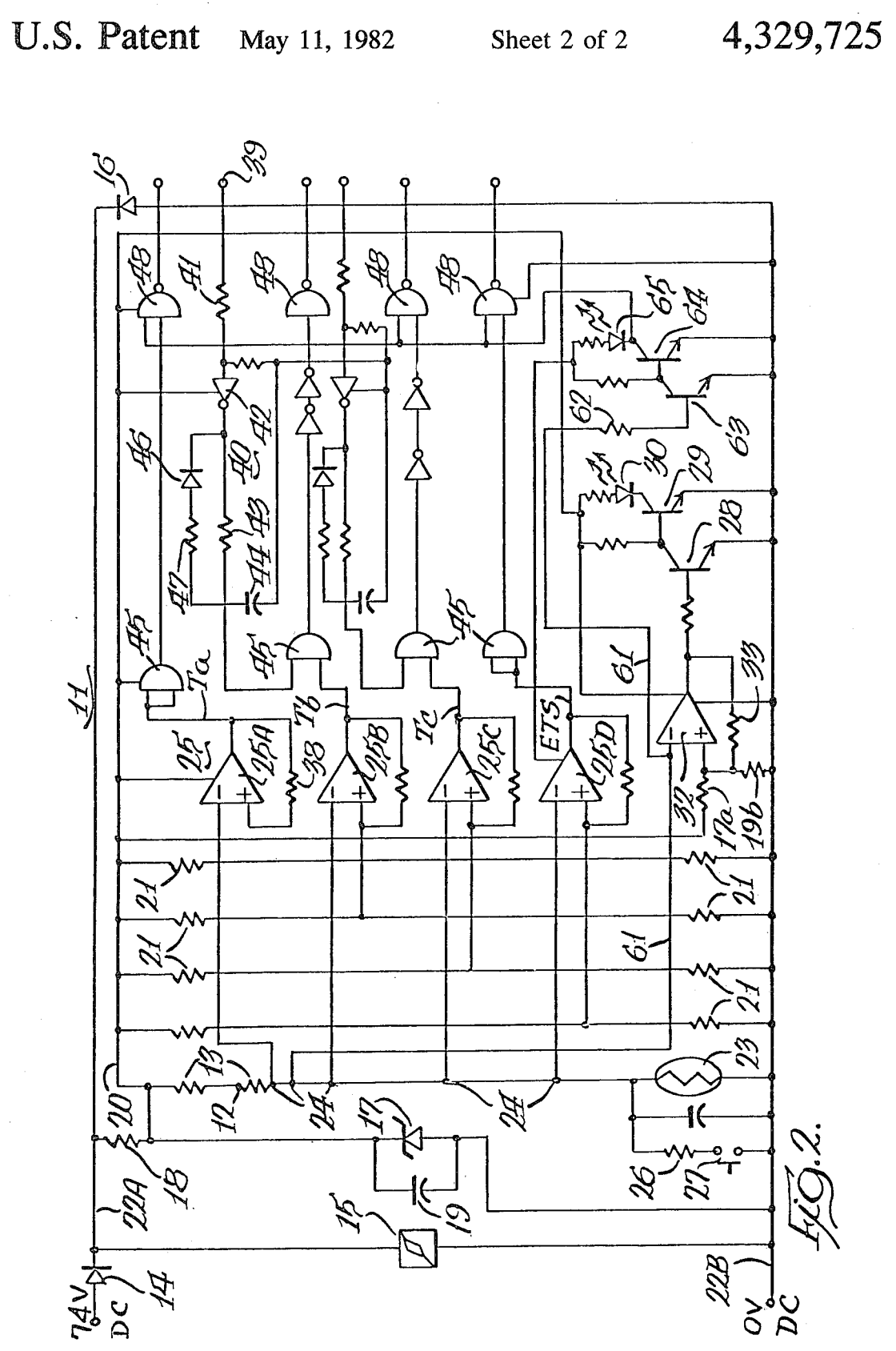

Referring to both FIG. 1 and FIG. 2, power for the multistage temperature controller circuitry 11 is provided from a 74 VDC bus supplied from the locomotive power generating facilities. Voltage reversal protection, such as might occur due such as to an installation error, is provided by a diode 14 connected in series between the +74 VDC supply and the controller circuitry.

A varistor 15 connected across the power leads 22A and 22B provides protection from unwanted transients for the semi-conductors and for the integrated circuit (IC) chips in the circuit 11. Varistor 15 is connected in parallel with a diode 16 (see right upper portion of FIG. 2), such that voltage spikes greater than the breakdown voltage of the diode 16 will be clamped by the varistor 15 while negative spikes will be limited to the forward bias voltage of the diode 16.

A zener diode 17 provides +10 VDC limit supply used for operation of the logic and linear integrated circuits of FIG. 1. A resistor 18, connected in series with zener diode 17, assures that the input current from the +74 VDC supply is essentially constant. A capacitor 19 connected in parallel with the zener diode 17 provides transient protection for the low voltage supply.

The voltage across the zener diode 17 is coupled across a resistive bridge network comprising eight resistors generally labeled 21. The junction of a thermistor sensor 23 and resistors 13 is connected to provide one input to each of the operational amplifiers 25A–25D functioning as comparators. The other input to each of the comparators 25A–25D is a selected voltage reference level obtained from the resistive bridge network.

The changing resistance of the thermistor 23 determines the voltage input to the inverting terminal of each of the comparators 25A–25D (note the terminal points generally labeled 24); and, this varying voltage across the thermistor 23 determines the switching temperatures of the comparators 25A–25D.

A resistor 26 and push-button 27 in parallel with the thermistor 23 provides a push-to-test function. The value of the resistor 26 is chosen so that when the push-button 27 is depressed, the parallel combination of the resistor 26 and thermistor 23 will be a low resistance which will simulate a high coolant temperature. Therefore, with the push-button 27 depressed, all output stages of the controller of FIG. 1 should operate indicating the operating condition of the controller circuitry. A capacitor 31 connected in parallel with the thermistor 23 and push-to-test button 27 dampens unwanted transients.

As mentioned above, comparator section 25 of the temperature controller utilizes operational amplifiers 25A, 25B, 25C and 25D functioning as comparators. The voltage across the thermistor 23 is coupled from terminal, generally labeled 24, to provide the inverting (−) input for each of the comparators, while the resistive bridge network 21 establishes the reference voltage inputs to the non-inverting (+) terminals of the comparators 25. The reference voltage inputs are compared with the voltage across the thermistor 23 and determine the temperature at which the respective cooling fans will operate. Positive feedback through respective resistors, generally labeled 38, between the output of each of the comparators 25A-25D to their corresponding non-inverting (+) input provides the required hysteresis.

As an example of operation of the comparator circuitry, a temperature of 174 degrees is required for the first stage, comparator 25A, output to saturate or go logically high (Ta cooling fans are turned ON). Each successive comparator 25B, 25C and 25D saturates as the temperature of the coolant reaches the setpoint determined by the resistor network 21.

When the thermistor 23 voltage starts to increase as the coolant temperature decreases, the comparators 25A-25D will be turned OFF (fans are turned ON) in a reverse sequence.

A time delay circuit 40 is provided to inhibit any two fans from being started simultaneously. The delay circuit 40 consists of a resistor 43 and capacitor 44 network, which has a long time constant; and, an inverter 30 generally labeled 42. The discharge time constant is reduced by using a diode 46, and a resistor 47 having a low resistance, in the discharge path for capacitor 44 so that there is little or no delay when switching off.

The operation of the time delay circuit can be considered as follows. When Ta is engaged, a low voltage is fed back from terminal 39, through resistor 41 and inverted by inverter 42 to provide a selected voltage input to the resistor 43 and capacitor 44 network. The capacitor 44 charges to a high level after approximately thirty seconds and provides a logic HIGH level to one input of the AND gate 45. As the temperature rises to the pick-up point of Tb, the other input to the AND gate 45 goes high and the Tb stage is engaged. Conversely, when the temperature drops below the drop out point of Tb, a logic LOW level is applied to one input of the AND gate 45 and Tb is disabled. Since Ta remains engaged, the state of the resistor 44 and capacitor 43 network is unchanged making it possible for Tb to be re-activated without the thirty second delay when the temperature again rises.

The foregoing permits the delay circuit to compensate for fast temperature cycling through the turn ON levels of the various fans; and, thus, enable a fan which has been turned OFF to be turned ON without a delay if the temperature first decreases then again starts to rise.

The outputs Ta, Tb, Tc, ETS (emergency throttling system) from the comparator circuits 25A-25D become the inputs to AND gates generally labeled 45. The AND gates 45 for Ta and ETS function to establish the needed logic level outputs for Ta and ETS, while the AND gates 45 in the circuits for Tb and Tc insure that the fans will operate in sequence.

The control circuitry has been so designed that a low logic level is necessary to activate the power output stages. Since the comparator circuitry provides high level output signals to indicate that cooling fans should be ON, NAND gates, generally labeled 48, are provided to give a low level output for normal operation.

Referring now to FIG. 3, the outputs from the NAND gates 48 provide the logic inputs to the power output stages through buffer transistor 49. For high level signals to the output stages, the buffer transistor 49 will conduct considerable collector current and will hold the power transistors 50 and 51 off because of the limited base drive to transistor 50. For low level inputs, the buffer transistor 49 will not be conducting, and the power transistors 50 and 51 will consequently be ON causing the output circuit of FIG. 3 to provide an output.

The two power transistors 50 and 51 are connected as a Darlington pair configuration to provide maximum output current with the collector-emitter voltage of transistor 51 being at a minimum, thereby increasing efficiency and minimizing heat dissipation problems. A metal oxide varistor 53 guards against transients caused by the inductive load of the motor fans.

An important feature of the invention is the current limiting or "fold-back" circuitry, shown in FIG. 3, and which will now be explained. During normal operation, with the transistor 49 OFF and transistor 51 saturated, transistor 54 will provide current to resistor 55 (a 200 ohm resistor), thereby holding the voltage at the emitter of transistor 52 at a constant level. The emitter of transistor 51 will be at a voltage greater than the voltage at the emitter of transistor 52 establishing a certain amount of current through resistor 56 (a 7.5 ohm resistor). Transistor 52 will be ON, but the base voltage of the transistor 50 will be high so that transistor 52 collector current will be low and the circuit will operate normally. Note that the collector of transistor 52 is coupled back to the base of transistor 50.

Upon the occurrence of a total or partial short, transistor 54 will be turned off thereby reducing the voltage across resistor 55. In this latter condition, the transistor 51 emitter current establishes the voltage across resistor 56 and drives transistor 52 to saturation. The collector current of transistor 52 (coupled through lead 59 to the collector of transistor 49) will reduce the base drive to the transistor 50 and bring the power transistors 50 and 51 out of saturation. The collector emitter voltage of the transistor 51 will rise and the collector current will decrease thereby limiting the output current on lead 61.

The fold-back circuitry will protect the controller from destruction for a short time period limited to approximately fifteen minutes. The temperature rise of the power transistors will destroy the controller circuitry if subjected to longer periods of shorted conditions.

Refer now to FIG. 4 which shows an alternative embodiment of the emergency throttling system, and designated as ETS2. With the exception of the ETS2, all power output stages are identical. The difference in ETS2 is shown in FIG. 4, and that difference being that power transistor 51 is not used in FIG. 4, and only power transistor 50 is used because of a lower output current requirement. Also, conventional current limiting with an NPN transistor 52 is used for the ETS2 output stage.

Refer now to FIGS. 1 and 2 with reference to the shorted sensor indicator. Should thermistor 23 short, the voltage across thermistor 23 goes to zero, and this voltage is coupled through lead 61 and resistor 62 to turn OFF transistor 63 and cause NPN transistor 64 to turn ON to cause current to flow through and light LED 65 to indicate a short condition.

An open sensor indicator 29 detects and alerts the user to an open thermistor 23 probe. An operational amplifier (op-amp) 32 circuit is used as a voltage comparator with the output voltage of thermistor 23 coupled to amplifier 32 as the inverting input (−) and a voltage divider network made up of discrete resistors 17a and 19b providing the non-inverting (+) input provides the necessary hysteresis. The amplifier 32 output becomes the input to an electronic "switch" comprising transistors 28 and 29 which drive a light emitting diode (LED) 30 indicator.

During normal operating conditions, the voltage across the thermistor 23 will be relatively low and so the inverting input to the op-amp 32 will be at a low potential. Since the input to the non-inverting (+) terminal is fixed at a voltage chosen such that only in the event of an open probe will the op-amp 32 change stages, the output will be high. The transistor 28 will be saturated while transistor 29 is held off since the collector emitter voltage of transistor 28 is insufficient to forward bias the base emitter junction of transistor 29. Therefore, no current flows through the LED 30, indicating that the probe is not opened.

Should the thermistor 23 probe be opened, the voltage at the inverting (−) input of op-amp 32 approaches +10 volts which is sufficient to drive the op-amp 32 low [the voltage at the inverting (−) input is greater than voltage at the non-inverting (+) input]. This in turn holds transistor 28 off while transistor 29 is saturated and drive and light the LED 30, thereby indicating an open probe.

Because of inherent offset voltages at the input to the op-amp 32 and device tolerances, the open probe indicator will falsely show a probe failure when the thermistor is exposed to temperatures below 0 degrees Fahrenheit. Also, once the op-amp 32 is driven low, the thermistor ambient must reach approximately 20 degrees Fahrenheit before the op-amp 32 is driven high extinguishing the LED. However, such false indications present no problem since the thermistor ambient will exceed 20 degrees Fahrenheit whenever the locomotive is operating.

While the invention has been particularly shown and described with reference to a preferred embodiment thereof, it will be understood by those skilled in the art that various changes in form and details may be made therein without departing from the spirit and scope of the invention.

What is claimed:

1. A fold-back current limiting circuit for protecting associated circuitry from damage from a short existing for a period of up to fifteen minutes, said fold-back circuit comprising first, second and third NPN transistors each having a base, emitter and collector, a fourth PNP transistor having a base, emitter and collector, said first and second transistors being connected as a Darlington pair, first and second resistors, said first transistor having its collector connected to an associated load, said first resistor having a relative much higher resistance than said second resistor, the emitter of said second transistor being connected to said second resistor, and to the base of said third transistor, the emitter of said third transistor being connected to the junction of said fourth transistor and said first resistor, said fourth transistor being connected in series with said first resistor across the power supply line, the second transistor being connected to the base of said fourth transistor, the collector of said third transistor being connected to the base of said first transistor, and first and second transistors being normally in saturation and causing said fourth transistor to provide current flow through said first resistor to hold the voltage at the emitter of said third transistor at a constant level, the second transistor providing some current flow in said second resistor such that the emitter of said second transistor is at a higher voltage than the emitter of said third transistor and in normal operation the base voltage of said first transistor is high and the collector current of the third transistor is low upon the occurrence of a short, said fourth transistor being turned off thereby reducing the voltage across said first resistor, the second transistor emitter current thence establishing the voltage across said second resistor and driving the third transistor to saturation, and the collector current of said third transistor reducing the base drive to said first transistor to take said first and second transistor out of saturation, such that the collector emitter voltage of said second transistor will rise and its collector current will decrease thereby limiting the output current.

* * * * *